US011823455B2

(12) United States Patent
Li et al.

(10) Patent No.: US 11,823,455 B2
(45) Date of Patent: Nov. 21, 2023

(54) METHOD FOR OPTIMIZING PROCESS OF DISPLAYING VIDEO STREAMS WITH SPECIFIED EVENT, APPARATUS EMPLOYING METHOD, AND COMPUTER READABLE STORAGE MEDIUM

(71) Applicant: Fulian Precision Electronics (Tianjin) Co., LTD., Tianjin (CN)

(72) Inventors: Chia-En Li, New Taipei (TW); Po-Hui Lu, New Taipei (TW); Yao-Wen Tung, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 107 days.

(21) Appl. No.: 17/538,035

(22) Filed: Nov. 30, 2021

(65) Prior Publication Data

US 2023/0046816 A1 Feb. 16, 2023

(30) Foreign Application Priority Data

Aug. 11, 2021 (CN) .......................... 202110917788.2

(51) Int. Cl.
*G06V 20/40* (2022.01)
*G06V 10/778* (2022.01)

(52) U.S. Cl.
CPC ............ *G06V 20/44* (2022.01); *G06V 10/778* (2022.01); *G06V 20/46* (2022.01)

(58) Field of Classification Search
CPC ....... G06V 20/44; G06V 20/46; G06V 10/778
See application file for complete search history.

(56) References Cited

U.S. PATENT DOCUMENTS

| 8,693,848 | B1 * | 4/2014 | Pacor | H04N 21/21805 |
| | | | | 386/296 |
| 2003/0023742 | A1 * | 1/2003 | Allen | H04N 21/4331 |
| | | | | 709/231 |
| 2012/0192242 | A1 * | 7/2012 | Kellerer | G06F 16/78 |
| | | | | 725/116 |
| 2015/0081721 | A1 | 3/2015 | Ptitsyn | |

(Continued)

FOREIGN PATENT DOCUMENTS

| EP | 2479684 A1 * | 7/2012 | ............. G06F 16/78 |
| EP | 3229174 A1 * | 10/2017 | ............. G06F 16/78 |

(Continued)

*Primary Examiner* — Carol Wang
(74) *Attorney, Agent, or Firm* — ScienBiziP, P.C.

(57) ABSTRACT

A method for optimizing a process of displaying video streams with specified event receives video streams. The video streams are sequenced based on a specified arrangement role to from a video stream queue. By analyzing each video streams, whether each video stream includes a specified event is determined. If each video stream without the specified event, the video streams are outputted based on the video stream queue. If the video stream includes the specified event, the video stream with the specified event is adjusted to be priority in the video stream queue, and the video streams are outputted based on the updated video stream queue. The video streams with the specified event can be prioritized processed and focus. A video stream processing apparatus and a computer readable storage medium applying the method are also provided.

15 Claims, 6 Drawing Sheets

(56) References Cited

U.S. PATENT DOCUMENTS

| | | | |
|---|---|---|---|
| 2015/0317801 A1* | 11/2015 | Bentley | G08B 21/043 |
| | | | 382/107 |
| 2015/0363648 A1* | 12/2015 | Li | G06F 18/23 |
| | | | 386/241 |
| 2018/0137360 A1* | 5/2018 | Hussein | G06N 3/045 |
| 2018/0338120 A1* | 11/2018 | Lemberger | G06V 20/41 |
| 2019/0197354 A1* | 6/2019 | Law | G06N 3/08 |
| 2019/0244029 A1 | 8/2019 | Cao et al. | |
| 2020/0364465 A1 | 11/2020 | Newman et al. | |
| 2021/0142168 A1* | 5/2021 | Kushnir | G06N 3/084 |
| 2021/0209402 A1* | 7/2021 | Harrison | G06V 20/64 |

FOREIGN PATENT DOCUMENTS

| | | | | |
|---|---|---|---|---|
| JP | 2008245150 A | * | 10/2008 | |
| JP | 2018195175 A | * | 12/2018 | H04L 67/12 |

* cited by examiner

METHOD FOR OPTIMIZING PROCESS OF DISPLAYING VIDEO STREAMS WITH SPECIFIED EVENT, APPARATUS EMPLOYING METHOD, AND COMPUTER READABLE STORAGE MEDIUM

FIELD

The subject matter herein generally relates to video streams display, specifically to a method for optimizing a process of displaying video streams with specified event, an apparatus, and a computer readable storage medium employing the method.

BACKGROUND

Video streams technology is used in a surveillance network system. Videos captured by monitor cameras are transmitted to a control platform in video streams. In use, there are a lot of the monitor cameras and the number of videos many, it is hard to find target data in the videos, which need to be focused on. Thus, the target data can be easily missed while viewing the videos, a purpose of the surveillance network system in time is reduced.

Thus, there is room for improvement in the art.

BRIEF DESCRIPTION OF THE DRAWINGS

Implementations of the present disclosure will now be described, by way of example only, with reference to the attached figures.

DETAILED DESCRIPTION

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure.

It will be understood that the specific embodiments described herein are merely some embodiments, not all the embodiments.

Unless otherwise defined, meanings of all technical and scientific terms used in this specification are the same as that usually understood by a person skilled in the art to which the present disclosure belongs. In the present disclosure, terms used in the specification of the present disclosure are merely intended to describe objectives of the specific embodiments, but are not intended to limit the present disclosure.

Figure 1:
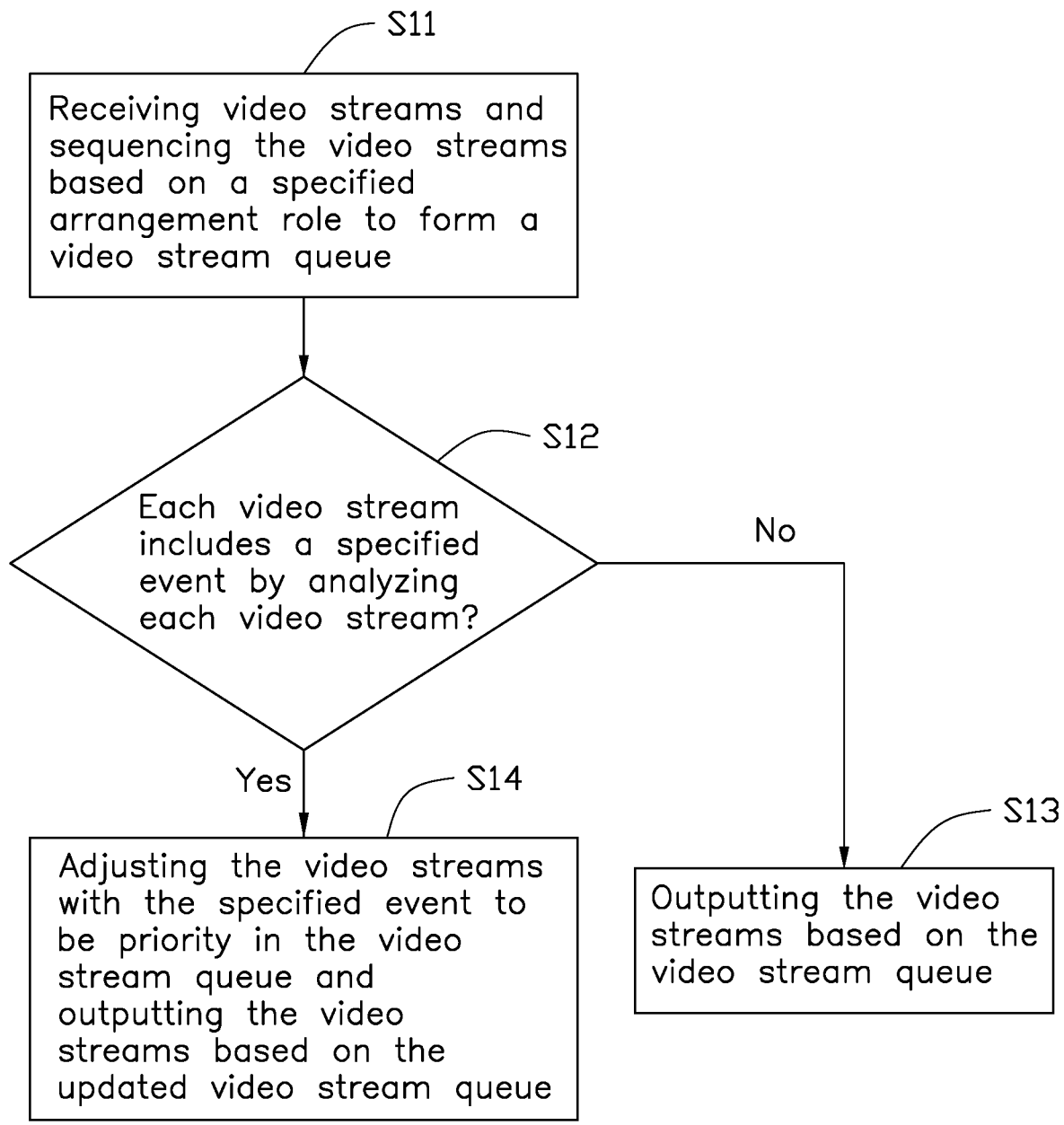
FIG. 1 is a flowchart illustrating an embodiment of a method for optimizing a process of displaying video streams with specified event according to the present disclosure.

FIG. 1 shows a flowchart of a method for optimizing a process of displaying video streams with specified event. Due to different requirements, a sequence of steps in the flowchart diagram can be changed, and some steps can be omitted. The method includes the following steps, these steps may be re-ordered:

In block S11, video streams are received and sequenced based on a specified arrangement role to from a video stream queue.

In some embodiment, the video streams are captured by several image-captured devices. The specified arrangement role can be a serial number of the image-captured devices. In other embodiments, the specified arrangement role can be other roles.

In block S12, whether each video stream includes a specified event is determined by analyzing each video streams.

In some embodiments, the specified event can be a specified target or object, such as a vehicle, a pedestrian, an animal, and the like, which needs to be focused on.

In block S13, the video streams are outputted based on the video stream queue if each video stream without the specified event.

In some embodiments, when each video stream without the specified event in a time point, the video streams are outputted based on the video stream queue as a normal outputting state.

In block S14, the video stream with the specified event is adjusted to be priority in the video stream queue, and the video streams are outputted based on the updated video stream queue, when the video stream includes the specified event.

In some embodiments, when the video stream includes the specified event in the time point, the video stream is extracted and placed at front of the video stream queue to form the updated video stream queue, and the video streams are outputted based on the update video stream queue.

For example, the image-captured devices A-Z captures the video streams A-Z respectively. The analyzed video streams A-Z without the specified event are outputted under the number queue of the image-captured devices A-Z as the video streams queue. When the video stream C includes the specified event, the video stream C is adjusted to be front of the video stream queue. The updated video stream queue is the video stream C, the video stream A, the video stream B, and the video streams D to Z. The video streams are outputted based on the updated video stream queue.

The method is used in a control center for monitoring specified regions. The control center uses several image-captured devices for monitoring the specified regions and output the captured video streams to the control center based on the video stream queue. Observers can orderly view the specified regions. When one of the video streams includes the specified event, the video stream is adjusted to be placed at front of the video stream queue. Thus, the observers can view the in time and focuses on the video stream with the specified event.

Figure 2:
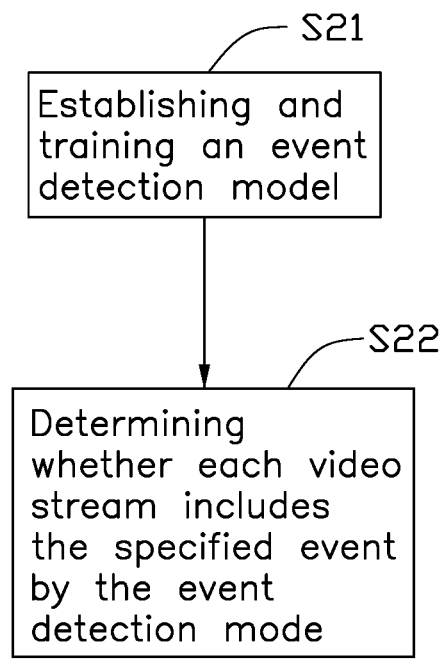
FIG. 2 is a detail flowchart illustrating an embodiment of block 12 in the method of FIG. 1 according to the present disclosure.

FIG. 2 shows a detail flowchart of the block S12. The block S12 includes:

In block S21, an event detection model is established and trained.

In block S22, each video stream includes the specified event is determined by the event detection model.

It should be understood that the event detection model is used for analyzing the video streams for determining whether the video stream includes the specified event.

Figure 3:
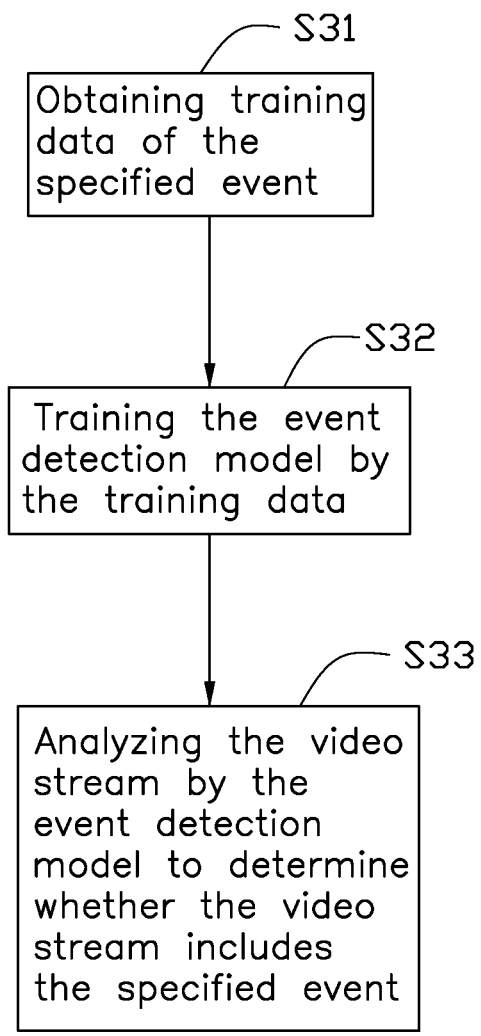
FIG. 3 is a detail flowchart illustrating an embodiment of block 21 in the method of FIG. 2 according to the present disclosure.

FIG. 3 shows a detail flowchart of the block S21. The block S21 includes:

In block S31, training data of the specified event are obtained.

In block S32, the event detection model is trained by the training data.

In block S33, the video stream is analyzed by the event detection model to determine whether the video stream includes the specified event.

It should be understood that the more training data, the higher accuracy of the event detection model is. There are different types of training data corresponding to different specified events.

Figure 4:
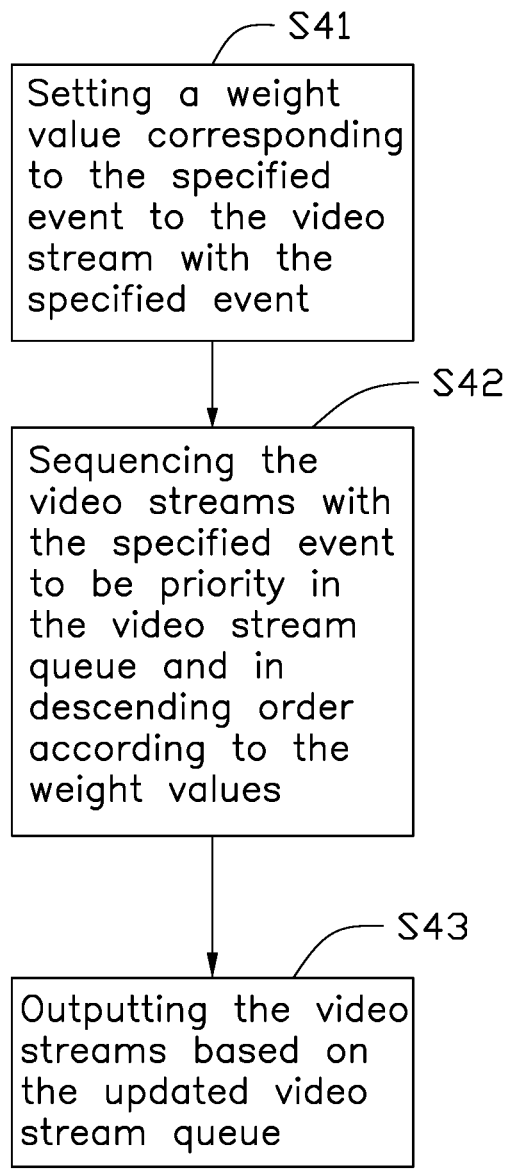
FIG. 4 is a detail flowchart illustrating an embodiment of block 14 in the method of FIG. 1 according to the present disclosure.

FIG. 4 shows a detail flowchart of the block S14. The block S14 includes:

In block S41, a weight value corresponding to the specified event is set to the video stream with the specified event.

In block S42, the video streams with the specified event are sequenced to be priority in the video stream queue and in a descending order according to the weight values.

In block S43, the video streams are outputted based on the updated video stream queue.

By setting weight value, the sequence of the video streams with the specified event are more accuracy, and the outputting sequence of the video streams are more reasonable.

In one embodiment, the weight value of the video stream corresponding to the specified event is computed by the following formula.

$$y_p = (w_1 \cdot E_1 + w_2 \cdot E_2 + \ldots + w_n \cdot E_n)$$
$$= \sum_{k=1}^{n} w_k \cdot E_k, \sum_{k=1}^{n} w_k = 1$$

$y_p$ represents a weight value of the video stream with the number p. $w_1$~$w_n$ represent weight values corresponding to different specified events. $E_1$~$E_n$ represent property values of different specified events. n is a positive integer. When the specified event is existed in the video stream, the property value is 1, when the specified event is not existed in the video stream, the property value is 0.

It is understood that each video stream can include serval specified events, and a sum of the weight values of each video stream is computed based on the formula. The different weight values are set to different specified events based on the formula. The weight value can be adjusted according to use's requirement. The sum of the $w_1$~$w_n$ is 1, thus the value of $y_p$ is in a range from zero to 1. Thus, the observers can directly view the video stream and it is convenience to subsequent calculations.

Figure 5:
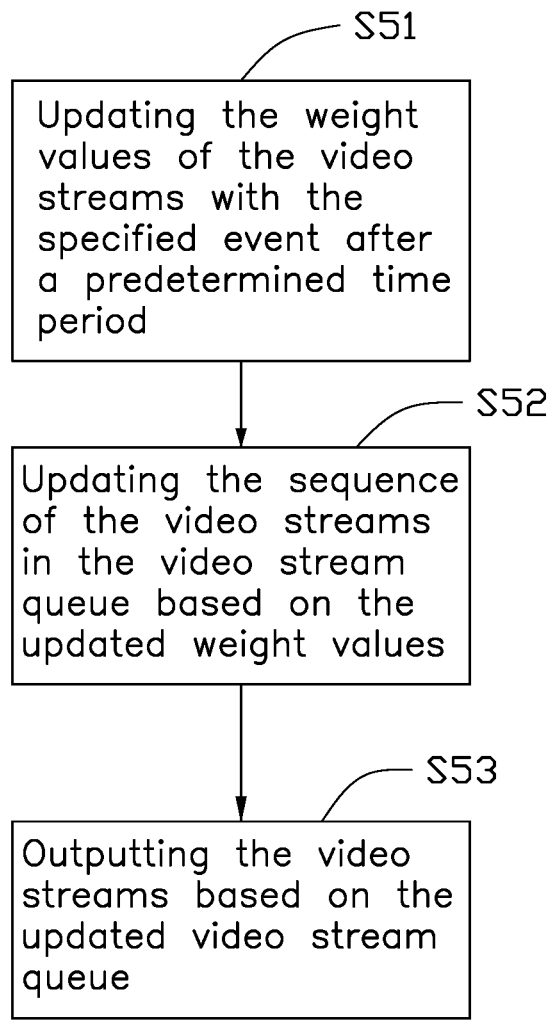
FIG. 5 is a detail flowchart illustrating an embodiment of blocks 51-53 after the block 14 in the method of FIG. 1 according to the present disclosure.

FIG. 5 shows steps of the method after the block S14.

In block S51, the weight values of the video streams with the specified events are updated after a predetermined time period.

In block S52, the sequence of the video streams in the video stream queue are updated based on the updated weight values.

In block S53, the video streams are outputted based on the updated video stream queue.

The method can sequence the video streams with the specified events in the descending order. The weight values of the video streams with the specified events are updated. The method also can include decreases the weight value for avoiding the video stream with the specified event at the first place of the video stream queue constantly occupied the first place, other video streams cannot be transmitted.

In one embodiment, the step of updating the weight values of the video streams is computed by the following formula.

$$y_p{}^* = y_p - q$$

$y_p$ represents the updated weight value. $y_p{}^*$ is larger than or equal to zero. q is a specified descending number. w is a weight value of the specified event. q is less than w.

The formula decreases the weight value of the video stream in front of the video stream queue by q and outputs the decreased weight value. The weight values of the video streams in the front of the video stream queue are decreased in cycles. The video stream with the specified event at the first place of the video stream queue constantly occupies the first place, other video streams cannot be transmitted. The outputting of the video streams is ensured.

In one embodiment, the step of analyzing the video streams can includes:

The video streams are analyzed in order based on the video stream queue.

It is understood that the method analyzes the video streams from the front of the video stream queue. When the specified event in the video stream is disappeared, the weight value of the video stream can be analyzed and updated in time to update the video stream queue, thus the response of the change of the video stream can be in time.

Figure 6:
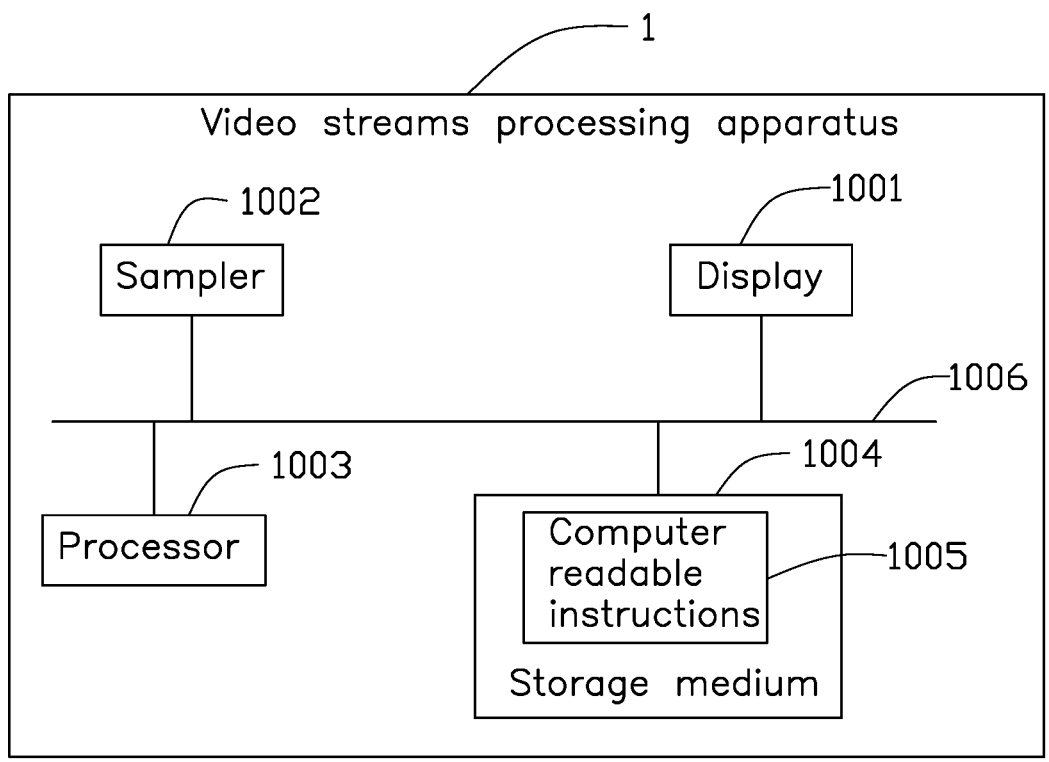
FIG. 6 is a diagram illustrating an embodiment of an apparatus according to the present disclosure.

FIG. 6 shows a video stream processing apparatus 100. The video stream processing apparatus 100 includes a sampler 1001, a display 1002, a processor 1003, a storage medium 1004, and a communication bus 1006, which connects with the sampler 1001, the display 1002, the processor 1003, and the storage medium 1004. The storage medium stores computer readable instructions 1005. The processor 1003 executes the stored computer readable instructions 1005 to implement the above method for optimizing a process of displaying the video streams. The sampler 1001 can include several monitoring cameras, cameras, monitor displays, and the like.

In one embodiment, the processor can be an artificial intelligence (AI) card. The AI card has advantages in data security, high computing speed, low energy cost, and low space cost. Thus, the video streams can be efficiently processed, and a stream result is outputted in a high real-time.

The present disclosure also provides a computer readable storage medium. The computer readable storage medium stores computer readable instructions, which can be executed to implement the above method for optimizing a process of displaying video streams.

Division of the modules is a division according to logical function, and other division manners may be adopted during practical implementation. Each function module in each embodiment of the present disclosure may be integrated into a processing module, each module may also exist independently and physically, and two or more than two modules may also be integrated into a module. The above-mentioned integrated module may be implemented in a form of hardware and may also be implemented in forms of hardware and software function module.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing a process of displaying video streams with a specified event, applicable in a video stream processing apparatus; the video stream processing apparatus comprising a non-transitory storage medium with program codes and a processor; the processor executing the program codes in the non-transitory storage medium to implement the method; the method comprising:

receiving video streams and sequencing the video streams based on a specified arrangement role to form a video stream queue;

determining whether each video stream comprises the specified event by analyzing each video stream;

outputting the video streams based on the video stream queue when each video stream fails to comprise the specified event;

adjusting the video streams with the specified event to have priority in the video stream queue and outputting the video streams based on an updated video stream queue when at least one video stream comprises the specified event;

wherein the adjusting the video streams with the specified event to have priority in the video stream queue and outputting the video streams based on the updated video stream queue comprises:

setting a weight value corresponding to the specified event to the video stream with the specified event;

sequencing each video stream with the specified event to have priority in the video stream queue and in descending order according to the weight values; and outputting the video streams based on the updated video stream queue;

wherein the weight value of each video stream corresponding to the specified event is computed by the following formula;

$$y_p = (w_1 \cdot E_1 + w_2 \cdot E_2 + \ldots + w_n \cdot E_n)$$
$$= \sum_{k=1}^{n} w_k \cdot E_k, \sum_{k=1}^{n} w_k = 1$$

$y_p$ represents a weight value of the video stream with the number p; w1~wn represent weight values corresponding to different specified events; E1~En represent property values of different specified events; n is a positive integer; when the specified event exists in the video stream, a property value of the specified event is 1; when the specified event does not exist in the video stream, the property value of the specified event is 0.

2. The method of claim 1, wherein the determining whether each video stream comprises the specified event by analyzing each video stream comprises:

establishing and training an event detection model; and determining whether each video stream includes the specified event by the event detection model.

3. The method of claim 2, wherein the establishing and training an event detection model comprises:

obtaining training data of the specified event;

training the event detection model by the training data; and analyzing the video stream by the event detection model to determine whether the video stream includes the specified event.

4. The method of claim 1, wherein the method further comprises:

updating the weight values of the video streams with the specified event after a predetermined time period;

updating a sequence of the video streams in the video stream queue based on the updated weight values; and outputting the video streams based on the updated video stream queue.

5. The method of claim 4, wherein the updating the weight values of the video streams with the specified event comprises:

updating each weight value of each video stream with the specified event by a following formula;

$$y_p^* = y_p - q$$

$y_p^*$ represents the updated weight value; $y_p^*$ is larger than or equal to zero; q is a specified descending number; w is a weight value of the specified event; q is less than w.

6. The method of claim 1, wherein the analyzing each video stream comprises:

analyzing each video stream in order based on the video stream queue.

7. A video stream processing apparatus comprising a non-transitory storage medium with program codes, which when being executed by a processor, causes the processor to:

receive video streams and sequencing the video streams based on a specified arrangement role to form a video stream queue;

determine whether each video stream comprises a specified event by analyzing each video stream;

output the video streams based on the video stream queue when each video stream fails to comprise the specified event by analyzing each video stream;

adjust the video streams with the specified event to have priority in the video stream queue and output the video streams based on an updated video stream queue when at least one video stream comprises the specified event;

wherein to adjust the video streams with the specified event to have priority in the video stream queue and output the video streams based on the updated video stream queue comprises:

setting a weight value corresponding to the specified event to each video stream with the specified event;

sequencing the video streams with the specified event to have priority in the video stream queue and in descending order according to the weight values; and outputting the video streams based on the updated video stream queue;

wherein the weight value of each video stream corresponding to the specified event is computed by the following formula;

$$y_p = (w_1 \cdot E_1 + w_2 \cdot E_2 + \ldots + w_n \cdot E_n)$$
$$= \sum_{k=1}^{n} w_k \cdot E_k, \sum_{k=1}^{n} w_k = 1$$

$y_p$ represents a weight value of the video stream with the number p; w1~wn represent weight values corresponding to different specified events; E1~En represent property values of different specified events; n is a positive integer; when the specified event exists in the video stream, a property value of the specified event is 1;

when the specified event does not exist in the video stream, the property value of the specified event is 0.

8. The video stream processing apparatus of claim 7, wherein to adjust the video streams with the specified event to have priority in the video stream queue and output the video streams based on the updated video stream queue comprises:
   establishing and training an event detection model; and
   determining whether each video stream comprises the specified event by the event detection mode.

9. The video stream processing apparatus of claim 7, wherein the processor further:
   updates the weight values of the video streams with the specified event after a predetermined time period;
   updates a sequence of the video streams in the video stream queue based on the updated weight values; and
   outputs the video streams based on the updated video stream queue.

10. The video stream processing apparatus of claim 9, wherein updating the weight values of the video streams with the specified event comprises:
   updating each weight value of each video stream with the specified event by a following formula;

$y_p^* = y_p - q$ $y_p^*$ represents the updated weight value; $y_p^*$ is larger than or equal to zero; q is a specified descending number; w is a weight value of the specified event; q is less than w.

11. The video stream processing apparatus of claim 10, wherein to analyze each video stream comprises:
   analyzing each video stream in order based on the video stream queue.

12. The video stream processing apparatus of claim 7, wherein the processor further:
   sets an updating period; and
   retrains a classifier of failures after each updating period.

13. A non-transitory computer readable storage medium storing program codes; the program codes executed by at least one processor to implement the following steps:
   receiving video streams and sequencing the video streams based on a specified arrangement role to form a video stream queue;
   determining whether each video stream comprises a specified event by analyzing each video stream;
   outputting the video streams based on the video stream queue when each video stream fails to comprise the specified event;
   adjusting the video streams with the specified event to have priority in the video stream queue and outputting the video streams based on an updated video stream queue when at least one video stream comprises the specified event;
   wherein the adjusting the video streams with the specified event to have priority in the video stream queue and outputting the video streams based on the updated video stream queue comprises:
   setting a weight value corresponding to the specified event to each video stream with the specified event;
   sequencing the video streams with the specified event to have priority in the video stream queue and in descending order according to the weight values; and
   outputting the video streams based on the updated video stream queue;
   wherein the weight value of each video stream corresponding to the specified event is computed by the following formula;

$y_p = (w_1 \cdot E_1 + w_2 \cdot E_2 + \ldots + w_n \cdot E_n) = \Sigma_{k=1}^{n} w_k \cdot E_k,$
   $\Sigma_{k=1}^{n} w_k = 1$ $y_p$ represents a weight value of the video stream with the number p; w1~wn represent weight values corresponding to different specified events; E1~En represent property values of different specified events; n is a positive integer; when the specified event exists in the video stream, a property value of the specified event is 1; when the specified event does not exist in the video stream, the property value of the specified event is 0.

14. The non-transitory computer readable storage medium of claim 13, wherein the determining whether each video stream comprises the specified event by analyzing each video stream comprises:
   establishing and training an event detection model; and
   determining whether each video stream includes the specified event by the event detection model.

15. The non-transitory computer readable storage medium of claim 13, wherein the method further comprises:
   updating weight values of the video streams with the specified event after a predetermined time period;
   updating a sequence of the video streams in the video stream queue based on the updated weight values; and
   outputting the video streams based on the updated video stream queue.

* * * * *